United States Patent
Niimi et al.

[11] Patent Number: 5,950,440
[45] Date of Patent: Sep. 14, 1999

[54] VEHICLE AIR CONDITIONER WITH COMPRESSOR NOISE REDUCTION CONTROL

[75] Inventors: Yasuhiko Niimi, Handa; Kurato Yamasaki, Kariya; Hiroshi Kishita, Anjo; Takayoshi Kawai, Hoi-gun, all of Japan

[73] Assignee: Denso Corporation, Kariya, Japan

[21] Appl. No.: 09/172,882

[22] Filed: Oct. 15, 1998

[30] Foreign Application Priority Data

Oct. 28, 1997 [JP] Japan ................................. 9-295067

[51] Int. Cl.⁶ .............................. F24F 11/02; B60H 1/00
[52] U.S. Cl. .......................... 62/133; 62/158; 62/228.3; 62/228.4
[58] Field of Search ............................. 62/115, 133, 157, 62/158, 180, 215, 228.1, 228.3, 228.4, 228.5, 231, 296, DIG. 17

[56] References Cited

U.S. PATENT DOCUMENTS

| | | | |
|---|---|---|---|
| 5,309,728 | 5/1994 | Chae | 62/158 |
| 5,400,611 | 3/1995 | Takeda et al. | 62/228.4 X |
| 5,630,323 | 5/1997 | Niijima et al. | 62/158 |
| 5,771,704 | 6/1998 | Nakajima et al. | 62/228.4 |

FOREIGN PATENT DOCUMENTS

| | | |
|---|---|---|
| U-60-194188 | 12/1985 | Japan. |
| A-62-37630 | 2/1987 | Japan. |
| A-62-112960 | 5/1987 | Japan. |

*Primary Examiner*—Harry B. Tanner
*Attorney, Agent, or Firm*—Harness, Dickey & Pierce, PLC

[57] ABSTRACT

In an electric vehicle air conditioner, unpleasant compressor noise is reduced after issuance of an instruction to stop the operation of the air conditioner. An air conditioner controller calculates a delay time T1 from a map stored in a microcomputer in advance when an air conditioning switch or a blower switch is turned off and initializes a built-in timer to start counting. Thereafter, the speed of rotation of the coolant compressor (the speed of rotation of an electric motor) is decreased at the maximum rate of change of the speed of rotation through an inverter until the calculated delay time T1 passes. After the delay time T1 passes (after the counting by the timer terminates), the coolant compressor is stopped. The delay time T1 recorded in the map is set such that it becomes shorter with a decrease in the blower level.

14 Claims, 9 Drawing Sheets

VEHICLE AIR CONDITIONER WITH COMPRESSOR NOISE REDUCTION CONTROL

CROSS-REFERENCE TO RELATED APPLICATION

This application is related to, and claims priority from, Japanese Patent Application Hei. 9-295067, filed Oct. 28, 1997, the contents of which are incorporated by reference.

BACKGROUND OF THE INVENTION

1. Technical Field

The present invention relates to a vehicle air conditioner suitable for electric cars, and more particularly to a vehicle air conditioner that reduces compressor noise during air conditioner transition from an on state to an off state.

2. Discussion

In an electrically-powered vehicle, an electric motor typically provides the driving force for a conventional air conditioner compressor. An air conditioning switch connected to the motor may be turned on immediately after it is turned off due to improper handling during the operation of the compressor. Because a difference between high and low pressures of the coolant remains in the refrigerating cycle immediately after the compressor is stopped, a greater driving force is required to restart the compressor than that required when the pressure in the refrigerating cycle is uniform.

In such a case, the compressor can not respond to an air conditioner operational request until the pressure difference in the refrigerating cycle reaches a restartable state, because the driving force of the electric motor is smaller than that supplied to a compressor from an internal combustion engine.

As a solution to this problem, Japanese Patent Application Laid-Open No. 62-37630 discloses an air conditioner which stops the operation of a refrigerating cycle by stopping a compressor after reducing the speed of rotation of the compressor gradually to achieve a uniform pressure of the coolant in the refrigerating cycle.

However, since a compressor is operated after an instruction to stop air conditioning is issued until the pressure of the coolant in the refrigerating cycle becomes uniform, the compressor tends to make unpleasant noises when the vehicle is at low speed or when the blower level is low.

SUMMARY OF THE INVENTION

The present invention has been conceived taking the above-described situation into consideration, and it is an object of the present invention to provide an air conditioner or vehicles which can reduce unpleasant compressor noise after issuance of an instruction to stop air conditioning.

More particularly, the present invention provides A vehicle air conditioner with a refrigerating cycle including a coolant compressor driven by an electric motor. A compressor controller stops said coolant compressor at a predetermined time interval after receiving a compressor stop instruction. The compressor controller delays stopping of the compressor until a predetermined refrigeration cycle parameter based on compressor noise factors is met. This parameter is programmed into the controller and may be a predetermined time interval, a high/low pressure differential value, a reduction in cycle pressure to or below a predetermined value, a reduction in compressor speed to or below a predetermined value, or any other similar parameter.

DETAILED DESCRIPTION OF THE PREFERRED EMBODIMENTS

Preferred embodiments of the present invention will now be described with reference to the accompanying drawings.

A first embodiment of the present invention will be described.

Figure 1:
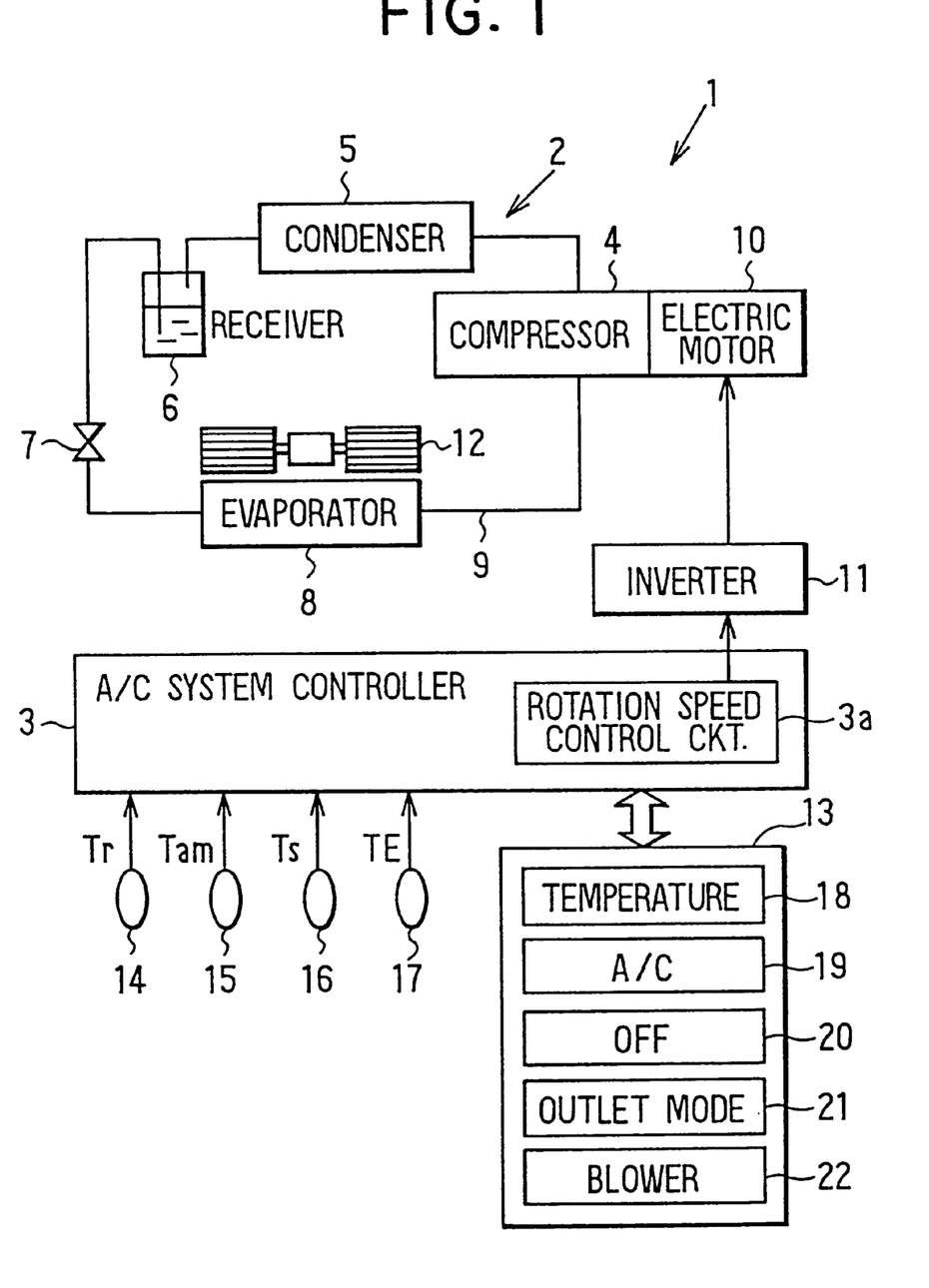
FIG. 1 is a schematic view showing a configuration of an air conditioner for vehicles.

FIG. 1 is a schematic diagram showing a configuration of a vehicle air conditioner. Preferably, the vehicle air conditioner is utilized in an electric car or hybrid car, and includes a refrigerating cycle 2 and an air conditioning controller 3 for controlling the operation of the air conditioner 1 as shown.

The refrigerating cycle 2 has a well-known configuration in which functional components such as a coolant compressor 4, a coolant condenser 5, a receiver 6, an expansion valve 7 and a coolant evaporator 8 are connected by coolant piping 9.

The coolant compressor 4 is directly connected to and rotatably driven by an electric motor 10. The speed of rotation of the electric motor 10 is varied under frequency control carried out by an inverter 11. The inverter 11 controls the frequency of the electric motor 10 based on a control signal output by a rotation speed control circuit 3a incorporated in the air conditioning controller 3.

The coolant evaporator 8, which is contained in a duct that supplies conditioned air to the interior of a vehicle, cools the air supplied by a blower 12 through heat exchange between the air and a low temperature coolant.

The air conditioning controller 3 incorporates a microcomputer in which control programs and various operational expressions associated with air conditioning control are stored. It receives operation signals output according to various operations on an air conditioning operation panel 13 and detection signals from various sensors, performs arithmetic processes on such input signals in accordance with control programs, and then controls each air conditioning apparatus based on the result of those processes.

When the operation of the air conditioner 1 is stopped, the coolant compressor 4 is stopped at a predetermined time interval, or delay time, after receiving an instruction to stop the operation of the air conditioner 1 instead of being stopped immediately after receiving the instruction to stop the operation of the air conditioner 1. This operation is referred to as "compressor delay control".

The sensors include an internal air sensor 14 for detecting the temperature Tr of the air inside the cabin, an ambient temperature sensor 15 for detecting ambient temperature Tam, a solar radiation sensor 16 for detecting the amount of solar radiation, and a post-evaporation temperature sensor 17 for detecting the temperature of the air which has passed through the coolant evaporator 8.

The air conditioning control panel 13 includes a temperature setting switch 18 for setting the temperature inside the cabin, an air conditioning switch 19 for outputting control commands to the air conditioning controller 3, an OFF switch 20 for outputting an operation stop command to the air conditioning controller 3, an outlet mode select switch 21 for switching the mode of the air outlet, and a blower switch 22 for switching the air quantity of the blower 12. In addition to switching the air quantity level, the refrigerating cycle 2, and thus the compressor, can be operated by turning on the blower switch 22 and can be stopped by turning off the switch.

Figure 2:
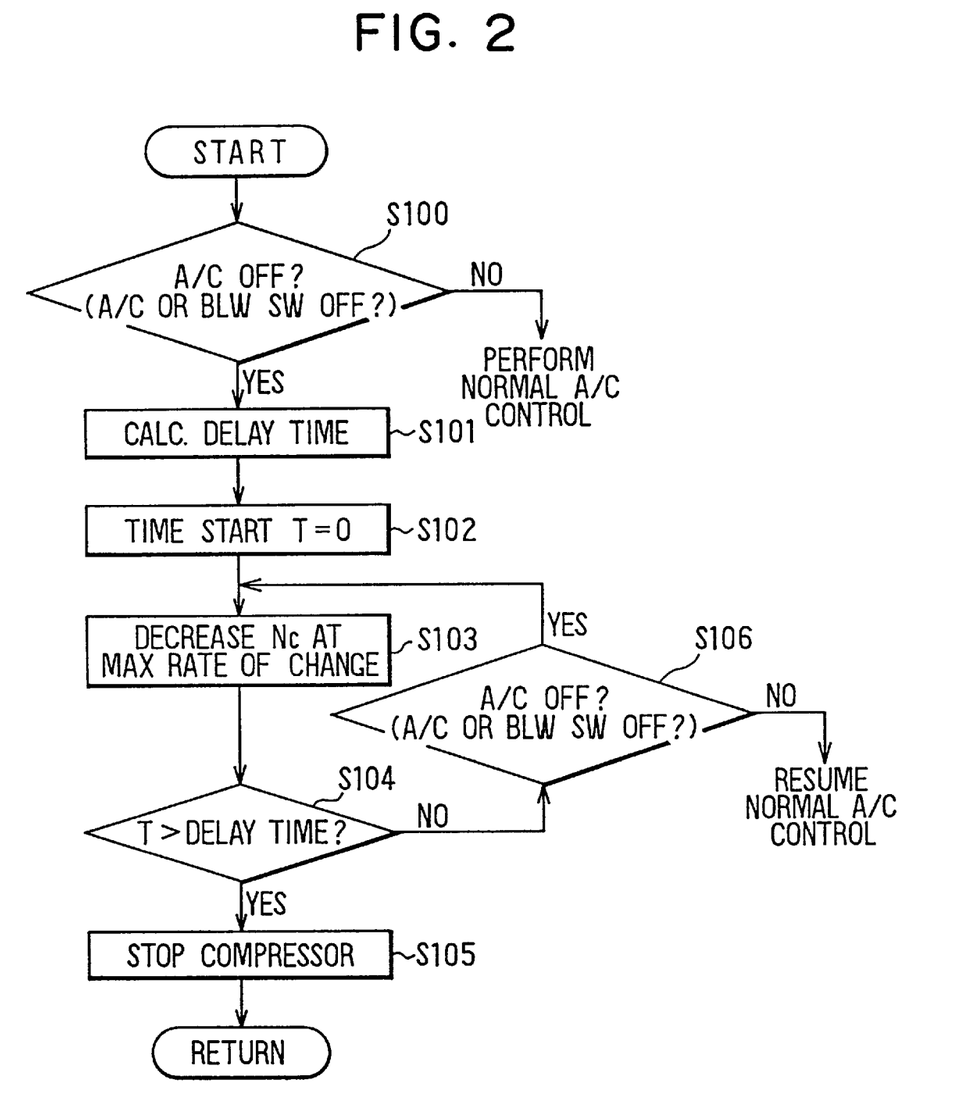
FIG. 2 is a flow diagram showing the operation of compressor delay control according to a first embodiment of the present invention.

Referring now to FIG. 2, an operation that stops the air conditioner 1 (control to delay the compressor) will now be described.

First, it is determined whether the air conditioner 1 is in an operating state or a non-operating state (S100). The determination is made based on whether the air conditioning switch 19 or blower switch 22 is in an on or off position.

Figure 3:
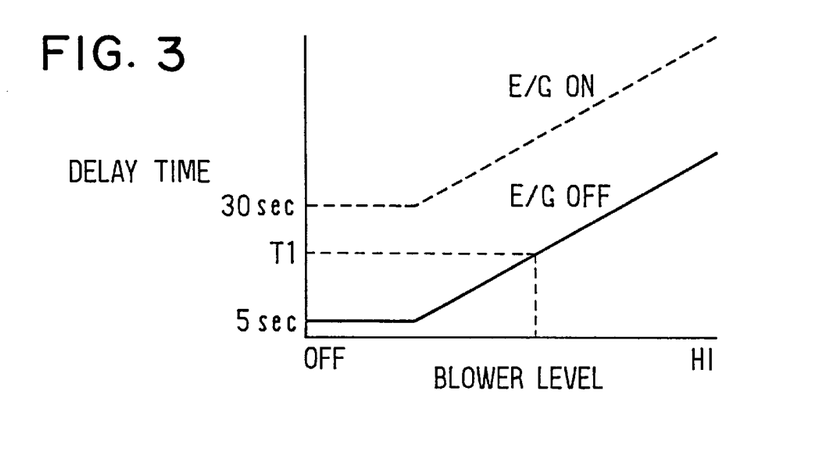
FIG. 3 is a map showing the relationship between a blower level and delay time according to the first embodiment.
Figure 4:
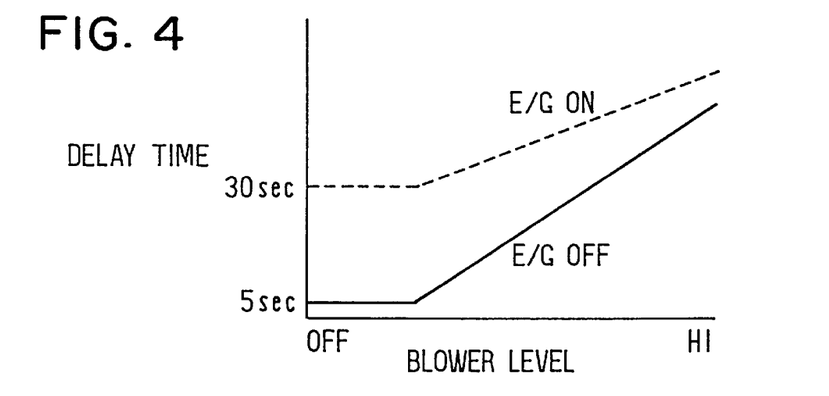
FIG. 4 is another map showing the relationship between a blower level and delay time according to the first embodiment.

When it is determined that the air conditioner 1 is in operation, normal air conditioning control of the type well known in the art is performed. When it is determined that the air conditioner 1 is not in operation, i.e., when the air conditioning switch 19 or blower switch 22 is in an off position, a delay time T1 is calculated from a map stored in the microcomputer in the air conditioning controller 3, as shown in FIG. 3 (S101). The map shown in FIG. 3 represents the relationship between the blower level and the delay time T1, and is set such that the delay time T1 decreases with a decrease in the blower level. In the case of a hybrid car having an engine, the delay time T1 may be varied depending on whether the engine is on or off. Specifically, the delay time T1 may be set such that it is shorter when the engine is stopped than when the engine is operated. The map shown in FIG. 3 is merely an example, and the delay time T1 may have different rates of change (gradients of the graph) relative to the blower level depending on whether the engine is on or off, as shown in FIG. 4.

After the delay time T1 is calculated at S101, the timer is initialized to start counting (S102).

Figure 5:
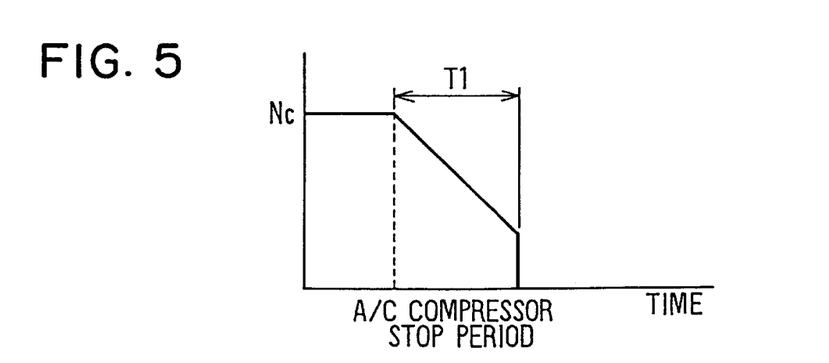
FIG. 5 is a timing diagram showing the operation of the first embodiment.

Subsequently, as shown in FIG. 5, the speed of rotation of the coolant compressor 4 (the speed of rotation of the electric motor 10) is decreased by the inverter 11 at the maximum change rate of the speed of rotation until the delay time T1 calculated at S101 passes (S103 and S104), and the coolant compressor 4 is stopped (S105) when the delay time T1 has passed (the timer terminates counting). When there is another instruction to activate the air conditioner 1 (i.e., when the air conditioning switch 19 or blower switch 22 is turned on) during the delay time T1, the normal air conditioning control is resumed at S106.

The present embodiment has the following advantages. According to the present embodiment, a delay time T1 may be set during a period between the reception of an instruction to stop the operation of the air conditioner 1 and the stop of the coolant compressor 4. The delay time T1 may be varied depending on the noise level of the vehicle (i.e., depending on the blower level or whether the engine is on or off). For example, a short delay time T1 may be set for a low blower level to stop the operation of the coolant compressor 4 in a relatively short period, thereby reducing unpleasant compressor noise.

Further, according to the above-described embodiment, since the speed of rotation of the coolant compressor 4 is decreased during the delay time T1 upon receipt of an instruction to stop the operation of the air conditioner 1, the difference between high and low pressures in the refrigerating cycle 2 can be reduced to minimize the driving force required to restart the coolant compressor 4.

While reference has been made to the blower level and the on and off states of the engine as examples of noise factors of a vehicle in the above description of the first embodiment, in a hybrid vehicle, the delay time T1 may be varied depending on the vehicle speed or engine speed.

A second embodiment of the present invention will now be described.

Figure 6:
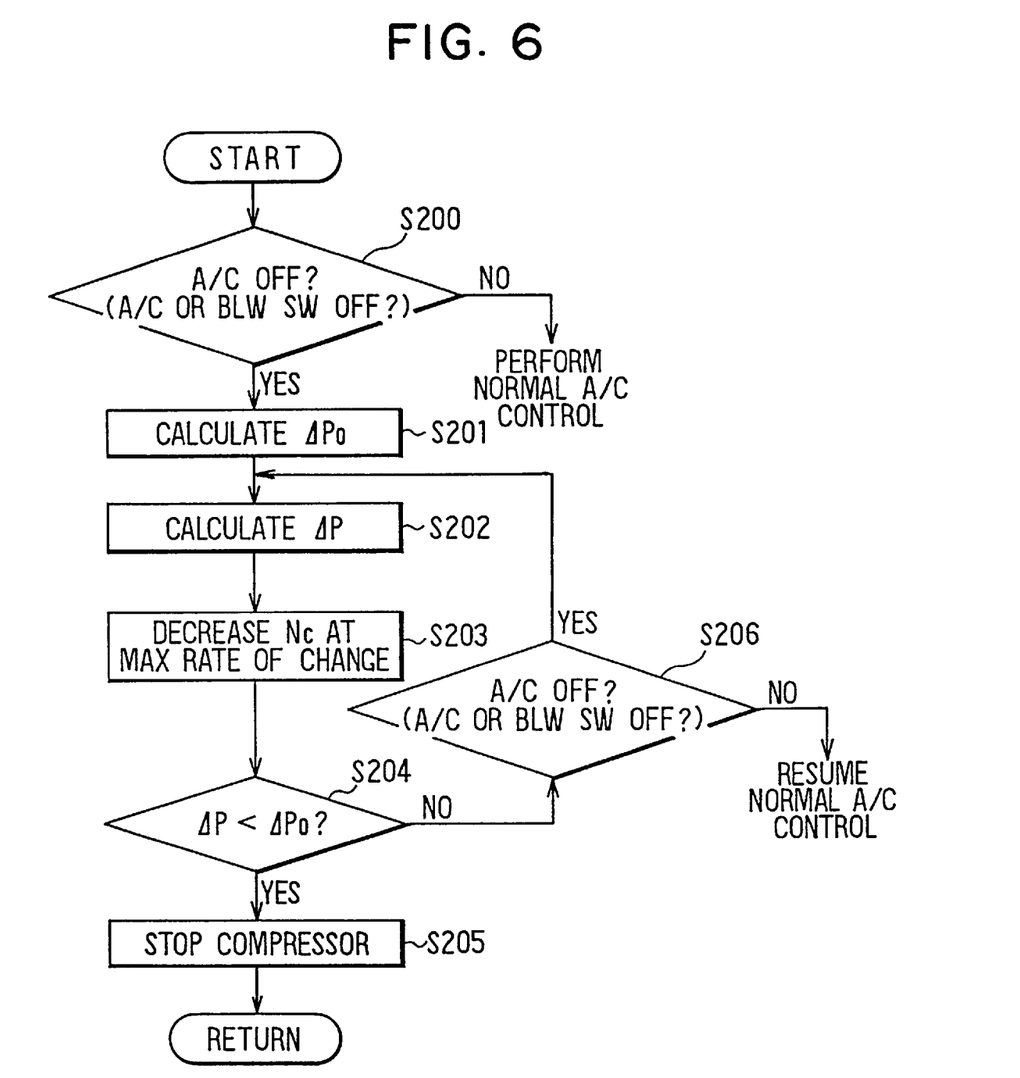
FIG. 6 is a flow diagram showing the operation of compressor delay control according to a second embodiment of the present invention.

FIG. 6 shows a flow diagram of the operation associated with stopping the air conditioner 1 (control to delay the compressor).

The compressor delay control according to the present embodiment gradually decreases the speed of rotation of the coolant compressor 4 upon receiving an instruction to stop the operation of the air conditioner 1, and to stop the coolant compressor 4 after the difference between high and low pressures in the refrigerating cycle 2 is reduced to a predetermined value or less.

It is first determined whether the air conditioner 1 is in an operating state or a non-operating state based on whether the air conditioning switch 19 or blower switch 22 is on or off (S200).

When the air conditioner 1 is in operation, normal air conditioning control is carried out.

Figure 7:
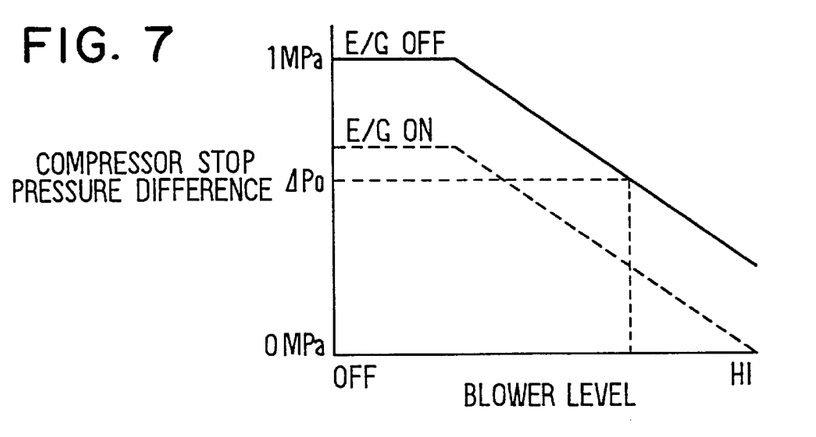
FIG. 7 is a map showing the relationship between a blower level and a pressure difference according to the second embodiment.
Figure 8:
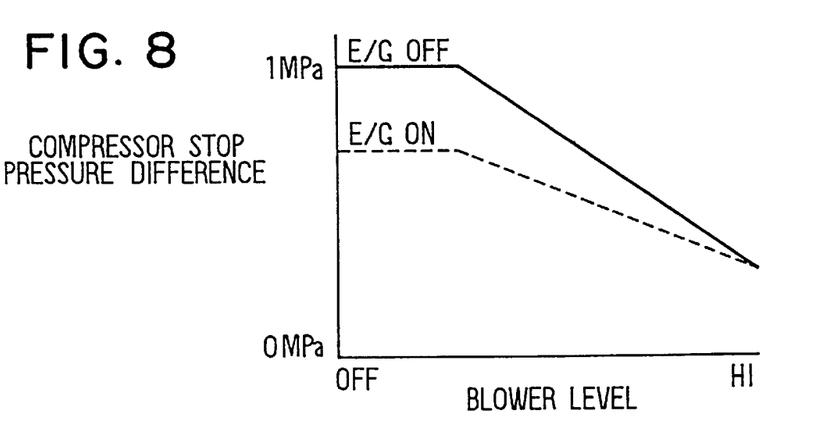
FIG. 8 is another map showing the relationship between a blower level and a stopping pressure difference according to the second embodiment.

When it is determined that the air conditioner 1 is in a non-operating state, a compressor stopping pressure difference $\Delta P0$ which is a set value for permitting stopping of the coolant compressor 4 (hereinafter referred to as "stopping pressure difference $\Delta P0$"), is calculated (S201) from the map stored in the microcomputer in the air conditioning controller 3, as shown in FIG. 7. The map in FIG. 7 represents the relationship between the blower level and the stopping pressure difference ΔP0, and is set such that the stopping pressure difference ΔP0 decreases as the blower level increases. In the case of a hybrid car having an engine, the stopping pressure difference ΔP0 may be varied depending on whether the engine is on or off. Specifically, the stopping pressure difference ΔP0 can be set such that it has a higher value when the engine is stopped than during the operation of the engine. The map shown in FIG. 7 is merely an example, and the stopping pressure difference ΔP0 may have, for example, different rates of change (gradients of the graph) relative to the blower level depending on whether the engine is on or off as shown in FIG. 8.

Subsequently, the difference between high and low pressures in the refrigerating cycle 2 ΔP is calculated, and the speed of rotation of the coolant compressor 4 (the speed of rotation of the electric motor 10) is decreased by the inverter 11 at the maximum change rate of the speed of rotation (S202 and S203).

Figure 9:
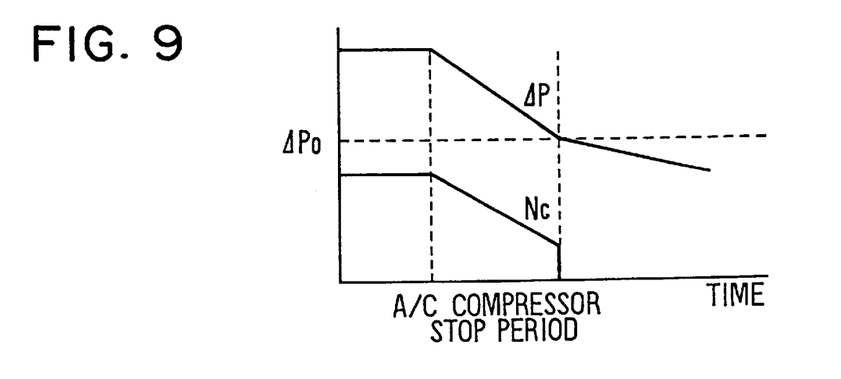
FIG. 9 is a timing diagram showing the operation of the second embodiment.

The pressure difference ΔP between high and low pressures in the refrigerating cycle 2 calculated at S201 is compared with the stopping pressure difference ΔP0 calculated at S201 (S204). If it is determined that the pressure difference ΔP is smaller than the stopping pressure difference ΔP0 the coolant compressor 4 is stopped (S205). FIG. 9 shows a timing diagram of the second embodiment.

When an instruction to operate the air conditioner 1 is received (i.e., when the air conditioning switch 19 or blower switch 22 is turned on) before the pressure difference ΔP decreases below the stopping pressure difference ΔP0, the normal air conditioning control is resumed at S206.

The present embodiment has the following advantages. According to the present embodiment, a stopping pressure difference ΔP0 is set as a value at which the stop of the coolant compressor 4 is permitted upon receipt of an instruction to stop the air conditioner 1. The stopping pressure difference ΔP0 may be varied depending on the noise factors of the vehicle (the blower level and the engine on/off state). For example, the stopping pressure difference ΔP0 may be set at a high value when the blower level is low to shorten the time required to stop the coolant compressor 4 after the receipt of an instruction to stop the operation of the air conditioner 1. This makes it possible to reduce unpleasant compressor noise within the otherwise quiet environment of the vehicle.

While reference has been made to the blower level and engine on/off state as noise levels of a vehicle in the second embodiment, the set pressure difference ΔP0 may be varied depending on the vehicle speed or engine speed in the case of a hybrid car.

A third embodiment of the present invention will now be described.

Figure 10:
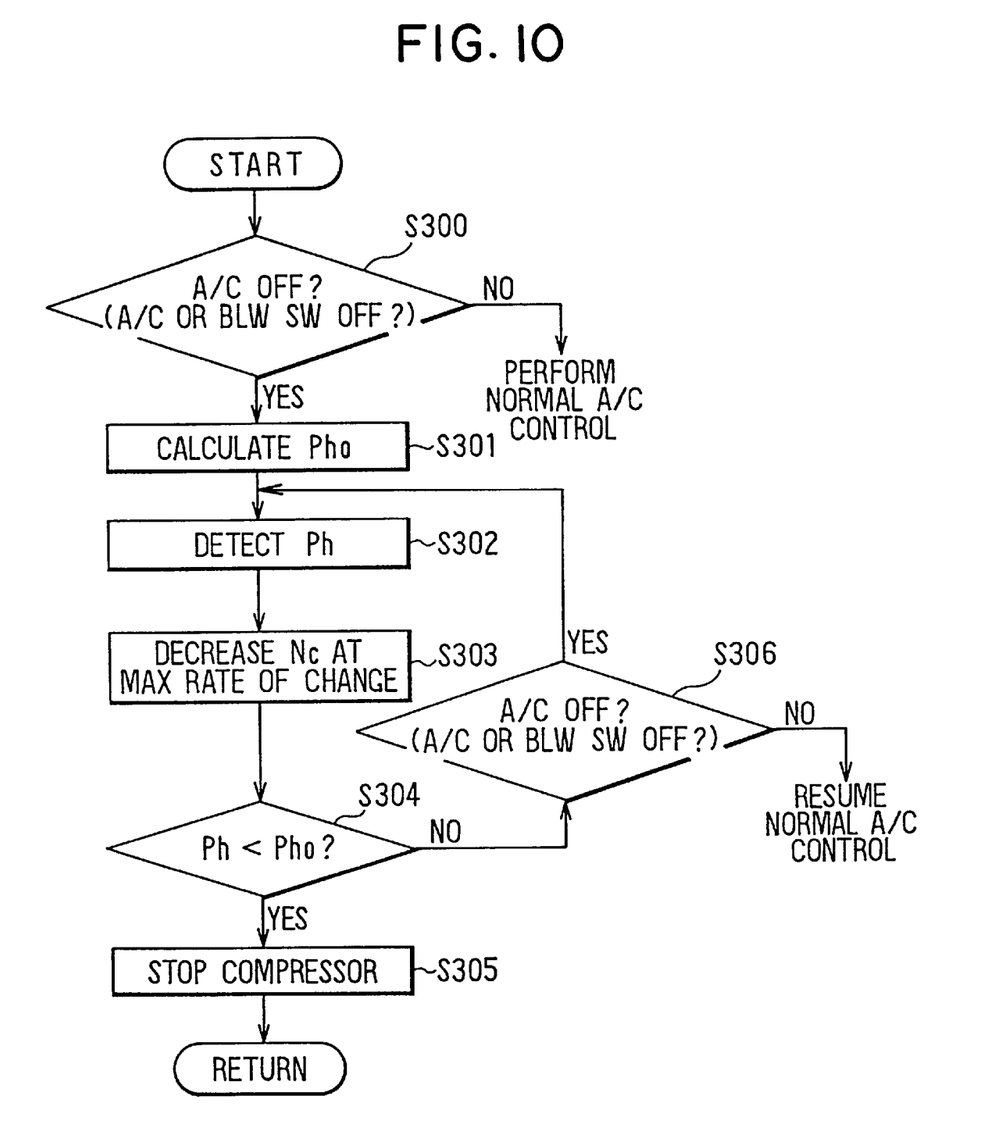
FIG. 10 is a flow diagram showing the operation of compressor delay control according to a third embodiment of the present invention.

FIG. 10 is a flow diagram showing the operation of stopping the air conditioner 1 (control to delay the compressor).

The compressor delay control according to the present embodiment gradually decreases the speed of rotation of the coolant compressor 4 upon receiving an instruction to stop the operation of the air conditioner 1 and to stop the coolant compressor 4 after the pressure in the refrigerating cycle 2 is reduced to a predetermined value or less.

In the third embodiment, it is first determined whether the air conditioner 1 is in an operating state or a non-operating state based on whether the air conditioning switch 19 or blower switch 22 is on or off (S300).

When the air conditioner 1 is in operation, normal air conditioning control is carried out. However, when it is determined that the air conditioner 1 is in a non-operating state, a compressor stopping high pressure Pho, which serves as a set value for permitting stopping of the coolant compressor 4 (hereinafter referred to as "stopping high pressure Pho") is calculated (S301) from the map stored in the microcomputer in the air conditioning controller 3 and shown in FIG. 11.

Figure 11:
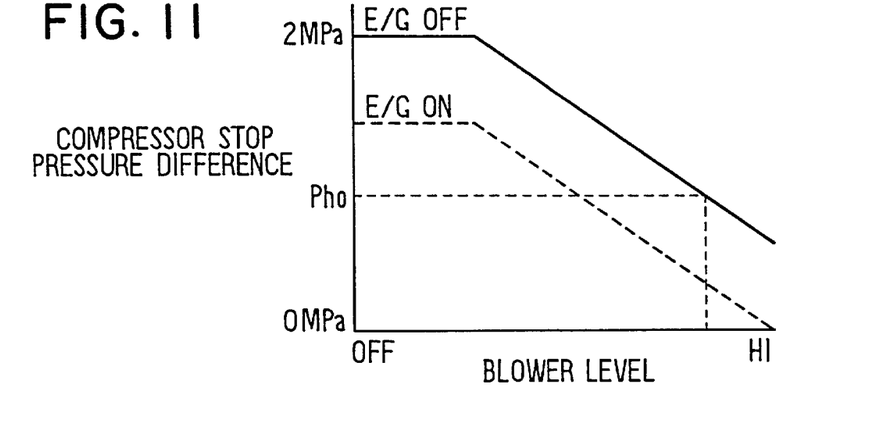
FIG. 11 is a map showing the relationship between a blower level and a stopping high pressure according to the third embodiment.
Figure 12:
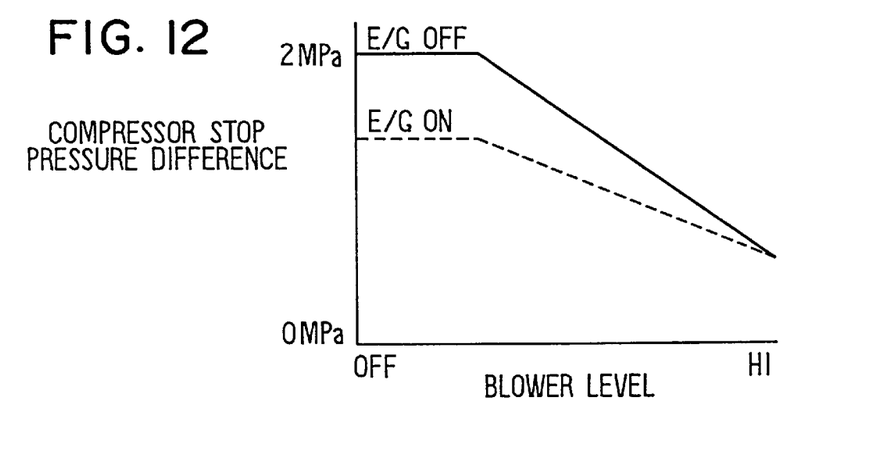
FIG. 12 is another map showing the relationship between a blower level and a stopping high pressure according to the third embodiment.

The map in FIG. 11 represents the relationship between the blower level and the stopping high pressure Pho and is set such that the stopping high pressure Pho decreases as the blower level increases. In the case of a hybrid car having an engine, the stopping high pressure Pho may be varied depending on whether the engine is on or off. Specifically, the stopping high pressure Pho can be set such that it is higher when the engine is stopped (off) than when the engine is in operation (on). The map shown in FIG. 11 is merely an example and, for example, the stopping high pressure difference Pho may have different rates of change relative to the blower level depending on if the engine is on or off, as shown in FIG. 12.

Subsequently, a high pressure Ph in the refrigerating cycle 2 is detected. Thereafter, the speed of rotation of the coolant compressor 4 (the speed of rotation of the electric motor 10) is decreased by the inverter 11 at the maximum change rate of the speed of rotation (S302 and S303).

Figure 13:
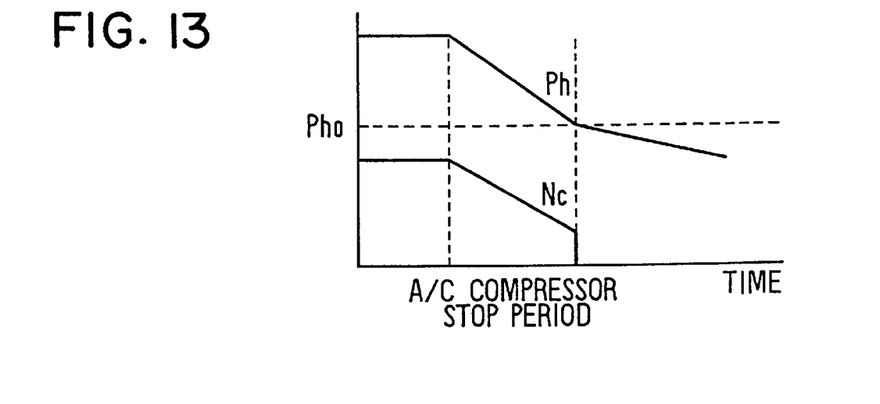
FIG. 13 is a timing diagram showing the operation of the third embodiment.

Then, the high pressure Ph in the refrigerating cycle 2 detected at S302 and the stopping high pressure Pho detected at S301 are compared (S304), and the coolant compressor 4 is stopped when it is determined that the high pressure Ph is lower than the stopping high pressure Pho (S305). In FIG. 13, a corresponding timing diagram is shown.

When an instruction to operate the air conditioner 1 is received (i.e., when the air conditioning switch 19 or blower switch 22 is turned on) again before the high pressure Ph becomes lower than the stopping high pressure Pho, the normal air conditioning control is resumed at S306.

The present embodiment has the following advantages. According to the present embodiment, a stopping high pressure Pho is set as a value at which the stop of the coolant compressor 4 is permitted upon receipt of an instruction to stop the air conditioner 1, and the stopping high pressure difference Pho may be varied depending on the noise factors of the vehicle (the blower level and the engine on/off state). For example, the stopping high pressure Pho may be set at a high value when the blower level is low to shorten the time required to stop the coolant compressor 4 after the receipt of an instruction to stop the operation of the air conditioner 1. This makes it possible to reduce unpleasant compressor noise.

While reference has been made to the blower level and engine on/off state as noise factors of a vehicle in the third embodiment, the stopping high pressure Pho may be varied depending on the vehicle speed or engine speed in the case of a hybrid car.

A fourth embodiment of the invention will now be described.

Figure 14:
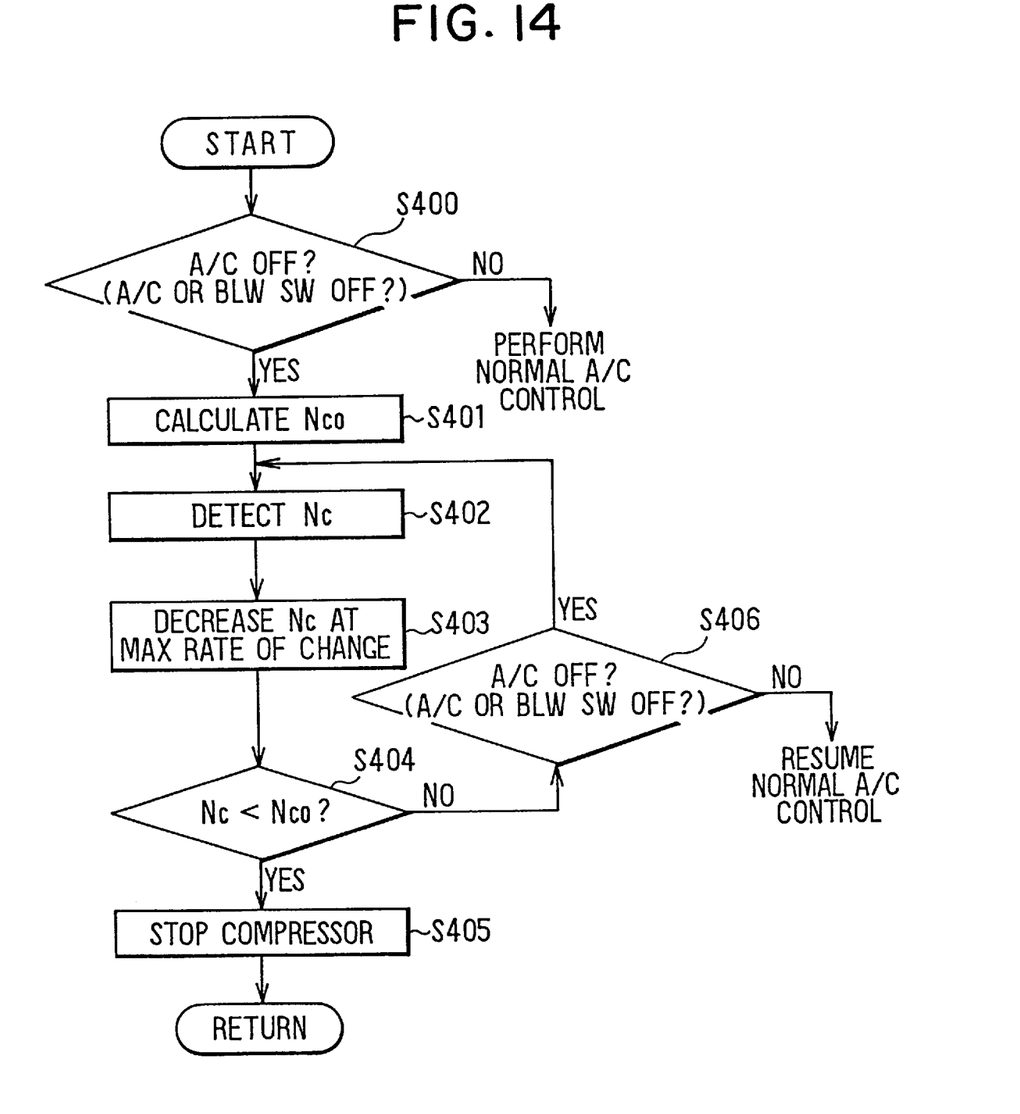
FIG. 14 is a flow diagram showing the operation of compressor delay control according to a fourth embodiment of the present invention.

FIG. 14 is a flow diagram showing the operation of stopping the air conditioner 1 (compressor delay control).

The compressor delay control according to the present embodiment is to gradually decrease the speed of rotation of the coolant compressor 4 upon receiving an instruction to stop the operation of the air conditioner 1, and to stop the coolant compressor 4 after the speed of rotation of the compressor is reduced to a predetermined value or less.

First, it is determined whether the air conditioner 1 is in an operating state or a non-operating state based on whether the air conditioning switch 19 or blower switch 22 is on or off (S400).

When the air conditioner 1 is in operation (i.e., when the air conditioning switch 19 or blower switch 22 is on), normal air conditioning control is carried out.

When it is determined that the air conditioner 1 is in a non-operating state, i.e., the air conditioning switch 19 or blower switch 22 is off, a compressor stopping speed of rotation Nco to serve as a set value for permitting stopping of the coolant compressor 4 (hereinafter referred to as "stopping speed of rotation Nco") is calculated (S401) from a map stored in the microcomputer in the air conditioning controller 3 and shown in FIG. 15.

Figure 15:
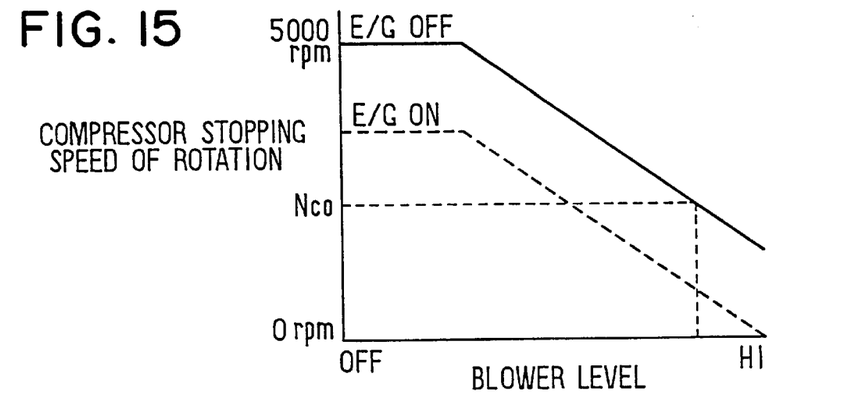
FIG. 15 is a map showing the relationship between a blower level and a stopping speed of rotation according to the fourth embodiment.
Figure 16:
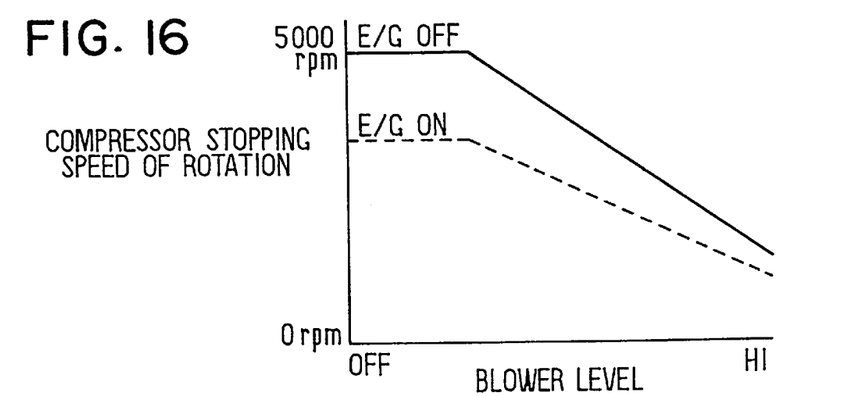
FIG. 16 is another map showing the relationship between a blower level and a stopping speed of rotation according to the fourth embodiment.

The map in FIG. 15 represents the relationship between the blower level and the stopping speed of rotation Nco, and is set such that the stopping speed of rotation Nco decreases as the blower level increases. In the case of a hybrid car having an engine, the stopping speed of rotation Nco may be varied depending on whether the engine is on or off. Specifically, the stopping speed of rotation Nco can be set such that it has a higher value when the engine is stopped than that during the operation of the engine. The map shown in FIG. 15 is merely an example, and the stopping speed of rotation Nco may have different rates of change relative to the blower level depending on whether the engine is on or off, as shown in FIG. 16.

Subsequently, the speed of rotation of the coolant compressor 4 (the speed of rotation of the electric motor 10) Nc is detected and, thereafter, the speed of rotation of the coolant compressor 4 (the speed of rotation of the electric motor 10) is decreased by the inverter 11 at the maximum change rate of the speed of rotation (S402 and S403).

Figure 17:
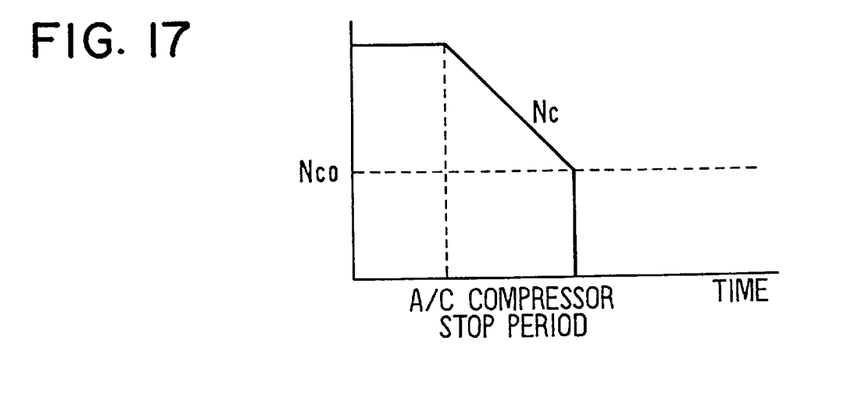
FIG. 17 is a timing diagram showing the operation of the fourth embodiment.

The speed of rotation of the coolant compressor 4 detected at S402 and the stopping speed of rotation Nco calculated at S401 are compared (S404), and the compressor 4 is stopped when it is determined that the speed of rotation Nc is lower than the stopping speed of rotation Nco (S405). FIG. 17 shows a timing diagram of the fourth embodiment.

When an instruction to operate the air conditioner 1 is received (i.e., when the air conditioning switch 19 or blower switch 22 is turned on) again before the speed of rotation Nc becomes lower than the stopping speed of rotation Nco, the normal air conditioning control is resumed at S406.

The present embodiment has the following advantages. According to the present embodiment, a stopping speed of rotation Nco is set as a value at which stopping of the coolant compressor 4 is permitted upon receipt of an instruction to stop the air conditioner 1. The stopping speed of rotation Nco may be varied depending on the noise factors of the vehicle. For example, the stopping speed of rotation may be set at a high value when the blower level is low to shorten the time required to stop the coolant compressor 4 after the receipt of an instruction to stop the operation of the air conditioner 1. This makes it possible to reduce unpleasant compressor noise.

While reference has been made to the blower level and engine on/off state as noise factors of a vehicle in the fourth embodiment, the stopping speed of rotation Nco may be varied depending on the vehicle speed or engine speed in the case of a hybrid car.

Although it is determined whether the air conditioning switch is in an operating or non-operating state based on whether the air conditioning switch 19 or blower switch 22 is on or off in each of the above-described embodiments, the condition for stopping the coolant compressor 4 (the delay time in the first embodiment, the stopping pressure difference $\Delta P0$ in the second embodiment, the stopping high pressure Pho in the third embodiment and the stopping speed of rotation Nco in the fourth embodiment) may be varied depending on whether the air conditioning switch 19 or blower switch 22 is turned off.

While the above detailed description is of the preferred embodiments of the present invention, the invention may be modified, varied and altered without deviating from the scope and fair meaning of the subjoined claims.

What is claimed is:

1. A vehicle air conditioner comprising:
   a refrigerating cycle including a coolant compressor driven by an electric motor; and
   compressor control means for stopping said coolant compressor at a predetermined time interval after receiving a compressor stop instruction, wherein said compressor control means includes a predetermined time interval varying means for varying said predetermined time interval based on vehicle noise factors.

2. The vehicle air conditioner of claim 1, wherein said predetermined time interval set by said predetermined time interval varying means decreases with a decrease in speed of the electric motor, in speed of the vehicle or in the blower level.

3. The vehicle air conditioner of claim 1, wherein said compressor control means decreases the speed of rotation of said coolant compressor upon receipt of said compressor stop instruction.

4. A vehicle air conditioner comprising:
   a refrigerating cycle including a coolant compressor driven by an electric motor; and
   compressor control means for gradually decreasing speed of said coolant compressor, upon receipt of a compressor stop instruction, to stop said coolant compressor after a difference between high and low pressures in said refrigerating cycle is decreased to a predetermined value or less, wherein said compressor control means includes a predetermined value varying means for varying said predetermined value based on vehicle noise factors.

5. The vehicle air conditioner of claim 4, wherein said predetermined value set by said predetermined value varying means increases with a decrease in electric motor speed, vehicle speed or blower level.

6. A vehicle air conditioner comprising:
   a refrigerating cycle including a coolant compressor driven by an electric motor; and
   compressor control means for gradually decreasing the speed of rotation of said coolant compressor, upon receipt of a compressor stop instruction, to stop said coolant compressor after high pressure in said refrigerating cycle is decreased to a predetermined value or less, wherein said compressor control means includes a predetermined value varying means for varying said predetermined value depending on vehicle noise factors.

7. The vehicle air conditioner of claim 6, wherein said predetermined value set by said predetermined value varying means increases with a decrease in motor speed, vehicle speed or blower level.

8. A vehicle air conditioner comprising:
   a refrigerating cycle including a coolant compressor driven by an electric motor; and
   compressor control means for gradually decreasing speed of rotation of said coolant compressor, upon receipt of a computer stop instruction, to stop said coolant compressor after speed of rotation of said coolant compressor is decreased to a predetermined value or less, wherein said compressor control means includes a predetermined value varying means for varying said predetermined value depending on vehicle noise factors.

9. The vehicle air conditioner of claim 8, wherein said predetermined value set by said predetermined value varying means increases with a decrease in engine speed, vehicle speed or blower level.

10. A method of controlling a vehicle air conditioner having a refrigeration cycle including a compressor driven by an electric motor, the method comprising:

receiving a compressor stop instruction;

delaying stopping of the compressor until a predetermined refrigeration cycle parameter based on compressor noise factors is met; and stopping the compressor after the step of delaying is completed.

11. The method of claim 10, wherein the delaying stopping of the compressor comprises delaying stopping of the compressor until a predetermined time interval elapses.

12. The method of claim 10, wherein the delaying stopping of the compressor comprises delaying stopping of the compressor until a difference between high and low pressures in the refrigerating cycle is decreased to a predetermined value or less.

13. The method of claim 10, wherein the delaying stopping of the compressor comprises delaying stopping of the compressor until high pressure in the refrigerating cycle is decreased to a predetermined value or less.

14. The method of claim 10, wherein the delaying stopping of the compressor comprises delaying stopping of the compressor until rotation of the compressor is gradually decreased to a predetermined value or less.

* * * * *